(12) United States Patent
Kay

(10) Patent No.: US 8,935,755 B1
(45) Date of Patent: Jan. 13, 2015

(54) MANAGING PERMISSIONS AND CAPABILITIES OF WEB APPLICATIONS AND BROWSER EXTENSIONS BASED ON INSTALL LOCATION

(75) Inventor: Erik Kay, Belmont, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/366,812

(22) Filed: Feb. 6, 2012

(51) Int. Cl.
*G06F 17/30* (2006.01)
*G06F 9/445* (2006.01)

(52) U.S. Cl.
CPC ...... *G06F 17/30867* (2013.01); *G06F 9/44526* (2013.01)
USPC ............................. 726/4; 726/1; 726/2; 726/3

(58) Field of Classification Search
CPC ..................... G06F 17/30867; G06F 17/30861; G06F 17/30657; G06F 8/61; G06F 9/44526; G06F 17/30899; H04L 63/126
USPC .......................................................... 726/1–4
See application file for complete search history.

(56) References Cited

U.S. PATENT DOCUMENTS

| | | | |
|---|---|---|---|
| 7,979,856 B2* | 7/2011 | Murray et al. ................. | 717/173 |
| 8,176,321 B1* | 5/2012 | Perry et al. ..................... | 713/167 |
| 8,181,254 B1* | 5/2012 | Kay et al. ......................... | 726/25 |
| 8,190,703 B2* | 5/2012 | Lin et al. ......................... | 709/217 |
| 8,200,962 B1* | 6/2012 | Boodman et al. .............. | 713/161 |
| 8,407,577 B1* | 3/2013 | Franklin et al. ................ | 715/208 |
| 2004/0061720 A1* | 4/2004 | Weber ............................ | 345/760 |
| 2005/0278421 A1* | 12/2005 | Simpson et al. ............... | 709/203 |
| 2009/0100263 A1* | 4/2009 | Leonard ......................... | 713/156 |
| 2009/0113392 A1* | 4/2009 | Wijenayake et al. .......... | 717/124 |
| 2009/0222925 A1* | 9/2009 | Hilaiel et al. .................... | 726/25 |
| 2010/0011352 A1* | 1/2010 | Chu et al. ........................ | 717/174 |
| 2011/0035435 A1* | 2/2011 | Meng et al. .................... | 709/203 |
| 2011/0126192 A1* | 5/2011 | Frost et al. ..................... | 717/178 |
| 2011/0145926 A1* | 6/2011 | Dalcher et al. .................. | 726/26 |
| 2011/0320818 A1* | 12/2011 | Krishna et al. ................. | 713/175 |
| 2012/0066666 A1* | 3/2012 | Ng et al. ........................ | 717/127 |
| 2012/0246701 A1* | 9/2012 | Swamy et al. .................... | 726/4 |
| 2012/0254286 A1* | 10/2012 | Harlow .......................... | 709/202 |
| 2012/0297017 A1* | 11/2012 | Livshits et al. ................ | 709/217 |
| 2013/0031457 A1* | 1/2013 | Griffiths et al. ............... | 715/231 |
| 2013/0047255 A1* | 2/2013 | Dalcher .......................... | 726/23 |
| 2013/0055369 A1* | 2/2013 | Kumar et al. .................... | 726/7 |
| 2013/0117716 A1* | 5/2013 | Stevens ........................... | 715/841 |

OTHER PUBLICATIONS

S, Bandhakavi, S.T. King P. Madhusudan, M. Winslett "VEX: Vetting Browser extensions for securitiy vulnerabilities", 19th Usenix Security Symposium, Washington DC, Aug. 11-13, 2010.*

(Continued)

*Primary Examiner* — Catherine Thiaw
(74) *Attorney, Agent, or Firm* — Brake Hughes Bellermann LLP

(57) ABSTRACT

A computer-implemented method for managing permissions and capabilities for web applications and browser extensions includes receiving via a digital marketplace a request to provide a web application or a web browser extension to a computing device. Based on the request, the web application or the browser extension is provided to a web browser of the computing device. The method includes determining if the digital marketplace is a trusted location for the computing device based on a set of trust criteria, and including additional features of the web application or the browser extension if the digital marketplace is determined to be the trusted location.

20 Claims, 7 Drawing Sheets

(56) References Cited

OTHER PUBLICATIONS

Adrienne Porter Felt, Kate Greenwood, David Wagner: "The effectiveness of Install-Time Permissions Systems for third-party applications", University of California at Berkely, Electrical Engineering and Computer Sciences, Technical report No. UCB/EECS-2010-143, Dec. 3, 2010, 13 pages.*

* cited by examiner

MANAGING PERMISSIONS AND CAPABILITIES OF WEB APPLICATIONS AND BROWSER EXTENSIONS BASED ON INSTALL LOCATION

TECHNICAL FIELD

This disclosure generally relates to security for web applications and browser extensions, and more particularly to managing permissions and capabilities of web applications and browser extensions.

BACKGROUND

Traditionally, personal computing hardware and software systems followed a model where users explicitly made trust decisions about every new piece of software installed and run on computer hardware. For instance, a user could install software by inserting a compact disk (CD) into a computer system. The user was responsible for the safety of the installed software.

Different security issues, however, may arise for software applications that are delivered to computers via the Internet via, for example, a web browser. For example, large companies may not wish to automatically trust each application that individual employees download.

As an application platform, the modern web browser brings together a remarkable combination of resources, including seamless access to Internet resources, including access to a wide variety of application software. For example, web browser extensions and web applications may be written using the same standard web technology that developers use to create web pages. This is beneficial because it allows developers to create content without having to be concerned with compatibility with the entire World Wide Web, such as presentation differences between different types of web pages. Yet, this potentially means that a web application or browser extension is vulnerable to standard classes of bugs. Accordingly, large companies and individual users need tools to manage permissions and capabilities for web applications and browser extensions.

SUMMARY

According to one general aspect, a computer-implemented method for managing permissions and capabilities for web applications and browser extensions includes receiving a request via a digital marketplace to provide a web application or a web browser extension to a computing device. Based on the request, the web application or the browser extension is provided to a web browser of the computing device. Providing the web application or the browser extension includes determining if the digital marketplace is a trusted location for the computing device based on a set of trust criteria, and including additional features of the web application or the browser extension if the digital marketplace is determined to be the trusted location.

In some implementations, the set of trust criteria includes one of: a list of trusted authors, and a list of trusted websites. The trust criteria may be synced between the computing device and at least one other computing device based on an account of a user associated with the computing device and the at least one other computing device. Further, the additional features may be specified by a user. In some implementations, the trust criteria are specified by a user of the computing device. The trust criteria may be stored at a server. The additional features may include machine executable code configured to be executed directly by a processor of the computing device. Providing the web application or the browser extension includes excluding the additional features of the web application or the browser extension if the digital marketplace is not determined to be the trusted location.

According to another general aspect, a computer-implemented method for enabling installation of web applications from trusted sources includes sending, from a client, a request to install a web application from a digital marketplace. The method includes allowing the client to install the web application if the web application fulfills a set of criteria, wherein the set of criteria include that the digital marketplace is the trusted location and that an author of the web application is trusted. The method includes preventing the client from installing the web application if the web application does not fulfill the set of criteria.

In some implementations, upon sending the request, a determination is made if the digital marketplace is the trusted location and if an author of the web application is trusted. The set of criteria may be synced between the client and at least one other computing device based on an account of a user associated with the client and the at least one other computing device. Upon preventing the client from installing the web application, a notification may be displayed, representing that the set of criteria is not fulfilled.

According to yet another general aspect, a tangible computer-readable storage medium has recorded and stored thereon instructions that, when executed by a processor of a computer system cause the computer system to receive, from a client, a request to provide a web application or a web browser extension and based on the request, provide the web application or the browser extension to a web browser of the client, including determining if the digital marketplace is a trusted location for the client based on a set of trust criteria; and include additional features of the web application or the browser extension if the digital marketplace is determined to be the trusted location.

According to yet another general aspect, a system includes a memory configured to store executable code, and a processor operably coupled to the memory. The processor is configured to execute the code to receive a request via a digital marketplace to provide a web application or a web browser extension to a computing device; and based on the request, provide the web application or the browser extension to a web browser of the computing device, including: determine if the digital marketplace is trusted for the computing device based on a set of trust criteria; and include additional features of the web application or the browser extension if the digital marketplace is determined to be trusted.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
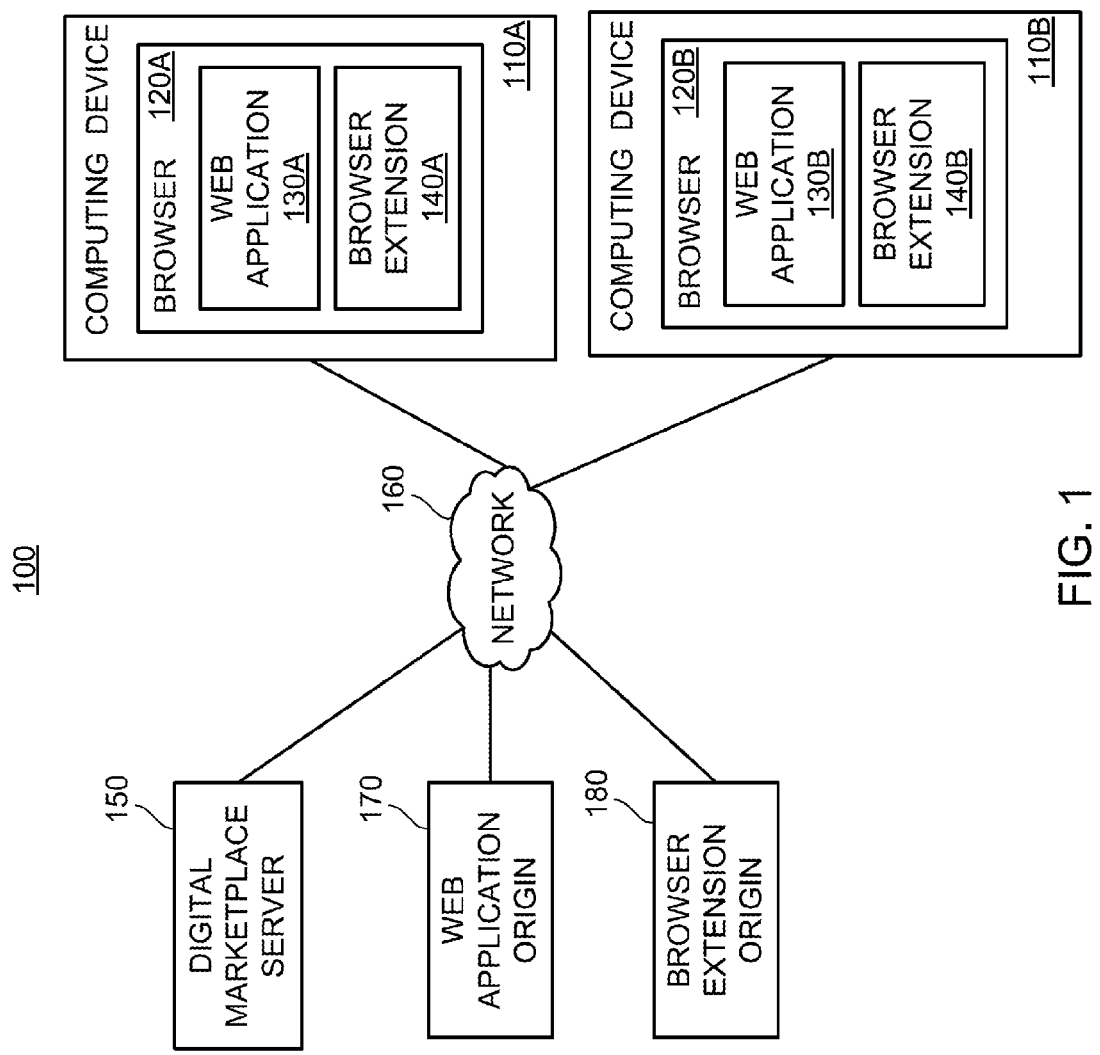
FIG. 1 illustrates an exemplary system in accordance with the disclosed subject matter.

A web browser executed by a client device can receive code (e.g., HTML code) from a remote server (e.g., a remote server that hosts a website) and can execute the received code on the client device for the benefit of a user of the client device.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with native applications that include machine executable code and are configured to be executed directly by a processor or via the operating system of the client device, whereas a web application may be incapable of execution or display without the aid of the web browser. Thus, web applications can be run inside a browser with a dedicated user interface, and typically provide functionality and an experience that is more rich and interactive than a standalone website but less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run standalone, like any regular website.

When installable web applications are "installed" by the user, the web applications may be added to and integrated with the user's web browser. Installation can include adding a shortcut to an application launcher area of the browser. An installation also allows web applications to obtain increased privileges without having to prompt the user for each one individually. Special user interface treatments may apply for the web application's tabs or windows. "Installing" a web application may include integration with: a client's operating system's task and window managers for easy window switching, a taskbar or quick-launch system, interoperating system notification(s), or persistently running background processes. Uninstallation allows for easy removal or deactivation of an installed application from the user's browser or system, and may include revoking all associated privileges. A server-side flag can be used to disable applications remotely.

Browser extensions and web applications can be created for installation in and execution by a browser running on a client computing device. Users who download browser extensions and web applications may get additional functionality for browser extensions and web applications that are installed from a trusted location, such as a trusted digital marketplace. Additional functionality may also be included for a web application that has a trusted company or a trusted developer as the author of the web application.

Computing Network

FIG. 1 is a block diagram of a computing network 100 in accordance with an example embodiment. The network 100 may be used to implement web applications and browser extensions using the techniques described herein. The depiction of network 100 in FIG. 1 is shown by way of example. It will be appreciated that other network configurations may be used for implementing such techniques.

The network 100 includes computing devices 110A and 110B. The computing devices 110A and 110B may take the form of a number of different devices, such as a personal computer, laptop computer, tablet computer, netbook computer, or a web-enabled phone, as examples. The devices 110A and 110B each include a browser 120A and 120B that may be used to access various types of content. Such content may include web sites, photos, video, audio and executable scripts, for example. As shown in FIG. 1, browser 120A includes web application 130A and browser extension 140A, which may be installed on the computing device 110A using the techniques described herein and, once installed, may operate as an integrated part of the browser 120A. The web application 130A may include respective client-side components of the application. Depending on the particular implementation, the web application 130A may include a description of the web application and/or code that is executable by the browser 120A, where that code provides functionality for the web application. Similarly, browser 120B includes web application 130B and browser extension 140B, which may be installed on the computing device 110B using the techniques described herein and, once installed, may operate as an integrated part of the browser 120B.

In the network 100, the computing devices 110A and 110B are coupled with a network 160. The network 160 may include a data access network that provides access to the Internet and/or the World Wide Web. Via the network 160, computing devices 110A and 110B (using browsers 120A and 120B, for example) may communicate with a digital marketplace server 150 (e.g., a web application server or web store), a web application origin 170 and a browser extension origin 180. In this example, the web application origin may comprise server-side components for the web applications 130A and 130B. The browser extension origin 180 may comprise server-side components for the browser extensions 140A and 140B. The web applications 130A and 130B and browser extensions 140A and 140B may operate using multiple origins. Therefore, the web applications 130A and 130B may have server-side components on multiple web application origins, for example.

In one implementation, the digital marketplace 150 may be configured to receive requests from user computing devices (such as the computing device 110) for installation of web applications and browser extensions, and to provide, in response to such requests, installation procedures (or installation packages) for the web applications or browser extensions. Such installation procedures/packages may include, at least, the client-side component for a requested web application.

In the arrangement shown in FIG. 1, browser 120A may be used to request installation of the web applications 130A and browser extension 140A by interacting with the digital marketplace server 150. For instance, the digital marketplace 150 may implement a website that is used to distribute web applications, among other content. As an example, the digital marketplace server 150 may implement an e-commerce site. Digital marketplace server 150 may acquire web applications and browser extensions from developers, for example from web application origin 170 or browser extension origin 180.

Requests to install web applications may be included in messages from the computing device 110 to the digital marketplace server 150 that indicate agreement to purchase respective web applications. In other implementations, the digital marketplace server 150 may take other forms or implement other techniques, such as providing access to free web applications, or may take the form of a developer's website which provides access to web application installation procedures/packages.

The specific actions performed when installing a web application may vary depending on the particular implementation and/or the particular web application. In an example implementation, installing a web application may include installing an icon that corresponds with the web application in an application launcher area of a web browser application. A user may then interact with this icon to launch the web application. In another example implementation, installing a web application may include syncing the web application across multiple computing devices (e.g., mobile phones, smart phones, tablets, laptops, desktops) that a user accesses, for example from different locations at different times (e.g., using the same login credentials).

In other implementations, installing a web application may include starting a background page for the web application, if the web application includes a background page feature. A background page of a web application may enable the web application to run as soon as the user logs into their computer, including before the user launches a web browser application or launches the associated web application in the web browser application. A background page may an invisible element running in a browser application, where the background page includes a declared association, in the web browser application, with the installed web application.

While network 100 illustrates only a single digital marketplace server 150, web application origin 170, and browser extension origin 180, it will be appreciated that additional digital marketplaces, servers, or origins may be included in network 100.

In some implementations, the web application origin 170 and browser extension origin 180 may also implement one or more websites that the computing devices 110A and 110B (e.g., using browsers 120A and 120B) may interact with to request installation of web applications 130A and 130B and browser extensions 140A and 140B. As an example, web application 130A may be a packaged application, which includes a manifest file that may include permissions (e.g., permissions to use local resources or do other things normal HTML code is not permitted to do) and at least one HTML file to provide a user interface, along with other files, such as image files. Browser extension 140A may also include a manifest file and an HTML file, for example.

As shown in FIG. 1, computing device 110A may communicate with a digital goods marketplace server 150 that provides a marketplace for digital goods to client computing device 110A. Because browsers 120A and 120B may communicate easily over network 160, the browsers may request information from digital marketplace server 150, such as information related to the development of web applications 130A and 130B, including the author(s), permissions, and capabilities of web applications 130A and 130B.

In some implementations, digital marketplace server 150 may be trusted because it includes a manual review management component, i.e., people review suspicious web applications and browser extensions for security issues, bugs, etc. Further, digital marketplace server 150 may be trusted because it may be operated by the same company that develops browsers 120A and 120B, for example, as well as operating systems used to execute web applications and browser extensions. In contrast, other origins (e.g., web application origin 170 and browser extension origin 180) may be less trusted because they are not known to include the same levels of manual review or other scrutiny as digital marketplace server 150, and because other origins may not provide trusted browsers or operating systems, for example.

Browsers 120A and 120B may also provide feedback to digital marketplace server 150 about the local usage of a web application on the client computing device. By receiving such feedback from many client computing devices 110A and 110B, digital marketplace server 150 may gather a great deal of information about how an application is actually used and about any security issues a user encounters after the application is downloaded from the digital marketplace server 150, for example. Thus, digital marketplace server 150 may analyze digital goods based on signals related to security issues, where such signals may include signals based on information about how applications actually perform after the applications are downloaded from the marketplace server 150 and installed on a client computing device. For example, users may report malware or bugs to digital marketplace server 150.

Digital Marketplace

Figure 2:
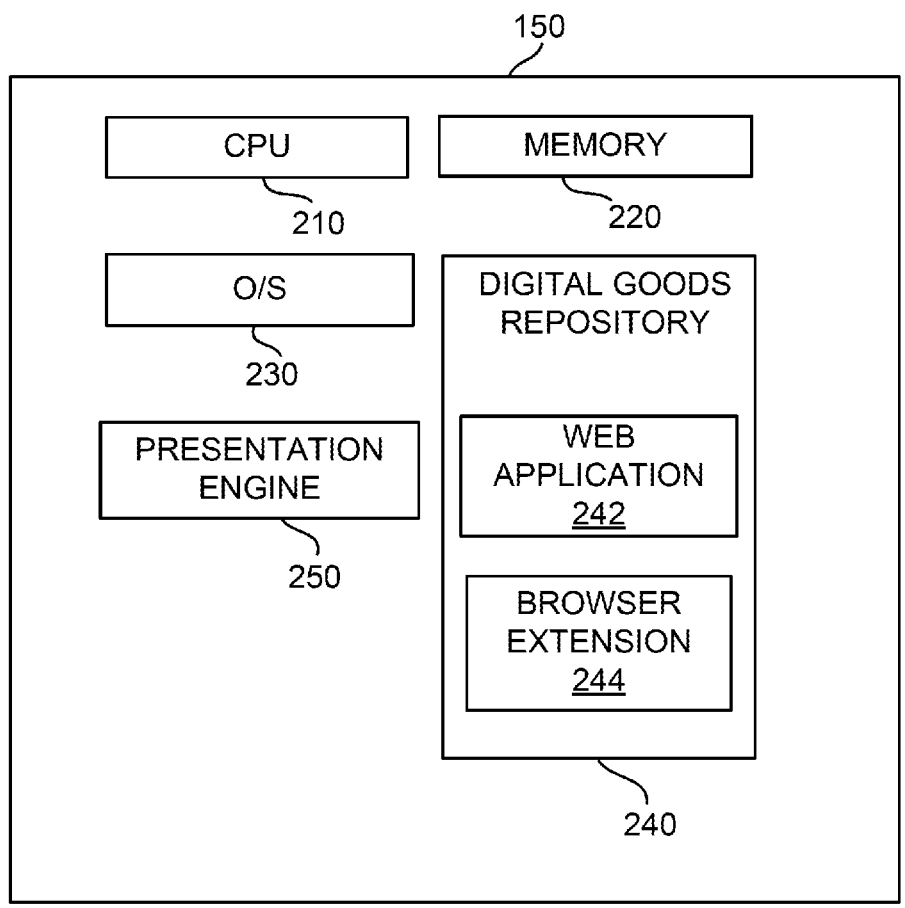
FIG. 2 is illustrates an exemplary digital marketplace server.

FIG. 2 illustrates a block diagram of a digital marketplace server. Digital marketplace server 150 may include one or more processors 210 and one or more memories 220. The digital marketplace server 150 may execute an operating system (O/S) 230 and various applications and services to provide functionality to client computing devices. For example, in one implementation, the digital marketplace server 150 may include a digital goods repository 240 (e.g., a database) including a web application 242 and browser extension 244.

The digital goods may be served from, or downloaded from, the digital goods repository 240 to the client computing devices (e.g., computing devices 110A and 110B shown in FIG. 1). In some implementations, the digital goods may be manually reviewed to before being offered to client computing devices, for example to detect or prevent security problems, or to categorize the digital goods. In certain implementations, the digital goods and related data may be stored in, and served to client computing devices from, a repository that is remotely located from the marketplace server. For example, digital goods could be stored and served to client computing devices from individual repositories that are operated and controlled by developers of the digital goods (e.g., web application origin 170 or browser extension origin 180 as shown in FIG. 1), and digital goods repository 240 of the digital marketplace server 150 may provide a reference to the individual repositories that are operated by the developers.

Digital goods repository 240 stores metadata associated with the digital goods that are available from or referenced by the digital goods repository 240. The metadata associated with a digital good may include a variety of information about the digital goods including, for example, information about the digital goods that are available from the repository 240. Such information may include, for example, representative keywords associated with the digital goods, the price associated with the digital goods, an author/creator/developer of the digital goods, credentials of the developer, permissions, optional capabilities, and other features of the digital goods. The metadata may also include demographic data about targeted users of the digital good, a time of year month or day during which the digital goods may be of the highest interest to a user, or other information.

The digital marketplace server 150 may include a presentation engine 250 that prepares information for transmission to the client computing devices 110A and 110B shown in FIG. 1, where the information is used by the client computing devices to display a user interface that shows representations of selected digital goods available in the marketplace, as described in more detail below with respect to FIG. 4.

The information that is provided by a client device to the digital marketplace server 150 (e.g., profile information, location, requests, etc.) may be provided on an opt-in basis. In other words, such information may be provided from the client computing device 110A to the server 150 only if the user of the client device specifically authorizes the transmission of such information from the client to the server. Further, in some implementations, security-related information may be reported to clients that have opted to receive such information, such as to a user who opted to receive security notifications when the user downloaded an application. In addition, data may be anonymized in one or more ways before it is sent, so that personally identifiable information is removed.

Client Computing Device

Figure 3:
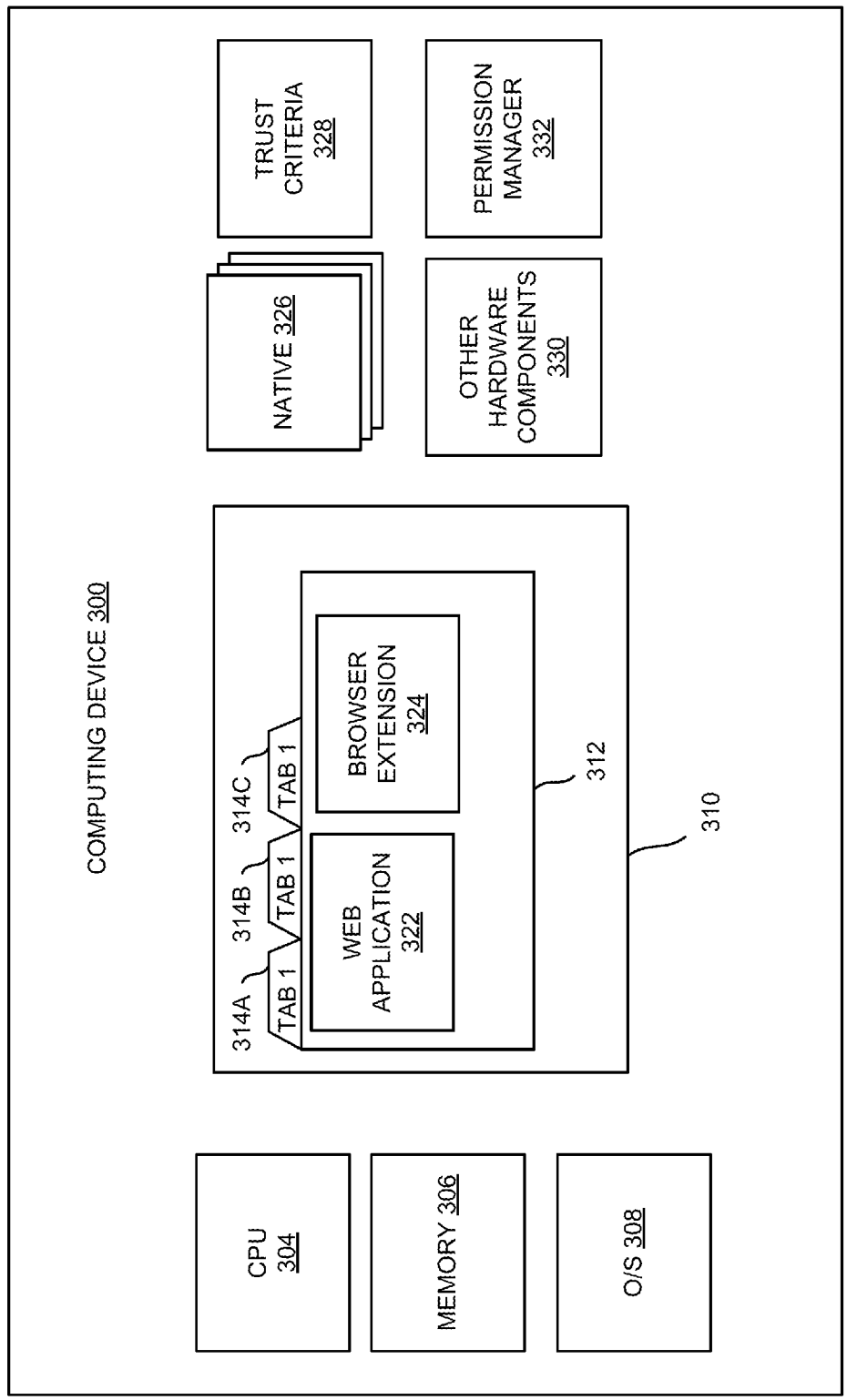
FIG. 3 is a schematic block diagram of an example client computing device.

FIG. 3 illustrates a block diagram of a computing device. Computing device 300 may include one or more processors (CPU) 304 and one or more memories 306. The client computing device 300 may execute an operating system 308 and an application 310, which may display a user interface window 312. Computing device 300 may include native applications 326, trust criteria 328, other hardware components 330 (e.g., a web camera, a microphone, additional storage mediums, a display or monitor, a keyboard, a fingerprint reader, a video processor, other input/output devices, etc.), and a permission manager 332. In some implementations, trust criteria 328 may be stored on a server, in addition to or as an alternative to storing trust criteria at computing device 300. In other implementations, trust criteria may be accessible via a local intranet, such as a company intranet. Trust criteria may be editable by certain users, for example users with administrative privileges for computing device 300. Trust criteria 328 may be synced, for example between the computing device 300 and at least one other computing device based on an account of a user associated with computing device 300 and the at least one other computing device.

In one implementation, client computing device 300 may be running or causing the operating system 308 to execute an application 310 or window 312. For purposes of illustration, window 312 is referred to as a web browser. However, it is understood that the above is merely one illustrative example to which the disclosed subject matter is not limited. In various implementations, window 312 may include a plurality of panes or tabs 314A, 314B, 314C. Window 312 may be a visual area containing a user interface. In a graphical user interface (GUI) used in computing device 300, window 312 may be a two-dimensional object arranged on a plane of the GUI known as the desktop. Window 312 may include other graphical objects, e.g., a menu-bar, toolbar(s), controls, icons and a working area in which a document, image, folder contents, or other main object may be displayed. For example, web application 322 and/or browser extension 324 may be included in window 312.

The working area may be capable of holding only one main object (i.e., in a single document interface) or more than one main object in a multiple document interface. In some applications, such as web browsers, multiple documents may be displayed in individual tabs 314A, 314B, 314C. These tabs 314A, 314B, 314C may be displayed one at a time, and may be selectable via a tab-bar which may reside above the contents of an individual window. That is, one selected tab 314A is "forward-facing" and displays information or content to a user in the window 312, while the content of other tabs 314B and 314C is "hidden."

In some implementations, computing device 300 may include one or more native applications 326, which may be installed locally and configured to be executed directly by the CPU 304 and directly interact with O/S 308. In such an implementation, the native applications 326 may include precompiled machine executable code. In some implementations, the native applications 326 may include a script interpreter (e.g., C shell (csh), AppleScript, AutoHotKey, etc.) or a virtual machine (e.g., the Java Virtual Machine, the Microsoft Common Language Runtime, etc.) that are configured to translate source or object code into executable code which is then executed by CPU 304.

In this context, a "browser extension" 324 may include one or more web pages packaged or grouped together as a definable whole, and configured to add functionality to the web browser 310. In one implementation, a browser extension 324 may add functionality by altering the way a web page or web site is displayed or rendered by the web browser 310 (e.g., by blocking advertisements, adding hyperlinks, etc.). In another implementation, the browser extension 324 may add functionality by communicating with a server (e.g., digital marketplace server 150 shown in FIG. 1) and updating or altering the user interface 312 of the web browser 310 (e.g., placing or changing an icon in a toolbar). The above are merely a few illustrative examples to which the disclosed subject matter is not limited.

In this context, a "web page" includes a file or document which is a portion of a web site. In various implementations, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various implementations, the web browser 310 may process one or more web pages in order to render one web page. For example, an HTML web page may be modified or include other web pages, such as, JavaScripts, a CSS file, various images, etc. It is understood that the above is merely one illustrative example to which the disclosed subject matter is not limited.

In this context, a "web site" may include a collection or grouping of related web pages that are generally viewable or understandable (once rendered by the web browser 310) to a user. In various implementations, when a web site is accessed via a communications network, the web site may be accessed via the Hypertext Transfer Protocol (HTTP) or Hypertext Transfer Protocol Secure (HTTPS). It is understood that the above is merely one illustrative example to which the disclosed subject matter is not limited.

In various implementations, the web browser 310 may include or be associated with one or more web applications 322. In this context, a "web application" may include a manifest file and at least a portion of a web site which itself includes web pages. In this context, a "web application" may be configured to help a user complete a single task or multiple tasks. In such an example, the web application 322 may be configured to be executed or interpreted by the web browser 310. This is compared with native applications 326 that include machine executable code and are configured to be executed directly by the CPU 304 or via the operating system 308. A web application 322 may be incapable of execution or display without the aid of the web browser 310.

In the illustrated implementation, the web application 322 may be packaged as an installable entity. In this context, "installation" includes the act of placing, semi-permanently or substantially permanently, one or more files (e.g., manifest file, HTML file, image file, etc.) on the computing device 300 for later execution or processing.

In various implementations, a user may select a web application (e.g., web application 322) to download and locally install on the computing device 300, for example from digital marketplace server shown in FIG. 1. In such an implementation, the web browser 310 may download the web application 322 and either store it locally in the packaged format, or un-package or decompress the web application into a predetermined location (e.g., a web application portion of a file system in a storage medium).

In one implementation, the web application 322 may include a metadata file or manifest file that includes information detailing or dictating how the web browser 310 should process or manage the web application and/or what the contents of the installable web application 322 are. In various implementations, the manifest file may include an author, a name, and a description of the web application 322. The manifest 322 may also include a URL or other identifier that, when requested by the user, will cause the web browser 310 to launch the web application 322 and cause the web browser 310 to access or execute the web site included by the web application 322. For example, the web application's manifest 136 may indicate that whenever a user seeks to access the web site http://www.npr.org the web application 322 is to be invoked and executed via the web browser 310, instead of accessing the remote server traditionally pointed to by the URL http://www.npr.org.

In one implementation, the web browser 310 may allow the web application 322 access to permissions or functionality not normally provided to a remote web site. In such an implementation, the computing device 300 may include a permission manager 332 configured to manage user allowed permissions for various features (e.g., access to the storage mediums, access to a camera, access to a location sensor, the ability to issue pop-up notifications to the user, etc.) of the computing device 300. In such an implementation, a web application 322 may indicate (e.g., via the manifest file) that the web application 322 may require or would desire permission to utilize one or more features associated with the computing device 300. In various implementations, these features may include accessing information provided by one or more components or system resources (e.g., a camera, storage space, network bandwidth, location, etc.) of the computing device 300. These are merely illustrative examples to which the disclosed subject matter is not limited.

In one implementation, when the web application 322 is installed, a user of computing device 300 may be asked to grant or deny the web application 322 permission to access one or more system resources. Alternatively or additionally, permission manager 332 of computing device 300 may grant or deny the web application 322 permission to access one or more system resources based on a set of trust criteria 328. The trust criteria 328 may be applied before, during, or after downloading the web application 322 from a digital marketplace. Trust criteria 328 may include a list of trusted locations or sources of web applications and browser extensions, trusted authors or developers, a category of application, permissions needed by the application, or other criteria. For example, digital marketplace server 150 and web application origin 170, as shown in FIG. 1, may be included in a list of trust criteria 328, but browser extension origin 180 may be excluded from the trust criteria 328. In this example, permission manager 332 may prevent the user from downloading any browser extensions from browser extension origin 180.

In some implementations, whitelists and/or blacklists may be used to control permissions. For example, a whitelist may be stored on digital marketplace server 150 or on computing device 300, for example to include a list of permissible install locations (e.g., websites, digital marketplaces), applications, developers, or types of applications (e.g., news, weather, or educational applications). As another example, a blacklist may be stored within a corporate intranet to prevent download of applications from certain websites or digital marketplaces, or to prevent certain applications or types of applications or extensions from being installed (e.g., games or social applications). Various combinations of whitelists and blacklists may be used. In one example, a whitelist in a corporate environment may allow employees to install productivity applications, and a blacklist may prevent specific games or social applications from being installed. In another example, the corporate environment may have a blacklist to prevent users of the corporate environment from downloading or installing any applications that request access to local storage media. As yet another example, a parent may create a whitelist (e.g., trust criteria 328 shown in FIG. 3) to allow children to install applications only from trusted websites.

In various implementations, if web application 322 does not satisfy the trust criteria 328, the installation of the web application 322 may fail, or may be prevented by computing device 300. In another implementation, the web application 322 may request access for required and/or desired permissions during or prior to installation on computing device 300. In such an implementation, the web application 322 installation may successfully complete even if some of the trust criteria 328 were not met, for example if a user allows the installation after a warning is displayed. In another example, a version of the web application 322 with limited features or permissions may be installed if certain of trust criteria 328 are not met. For example, a user may still install a web application from a non-trusted source, but the web application may not be allowed access to one or more system resources (e.g., the web application may not issue pop-up notifications).

Digital Marketplace User Interface

Figure 4:
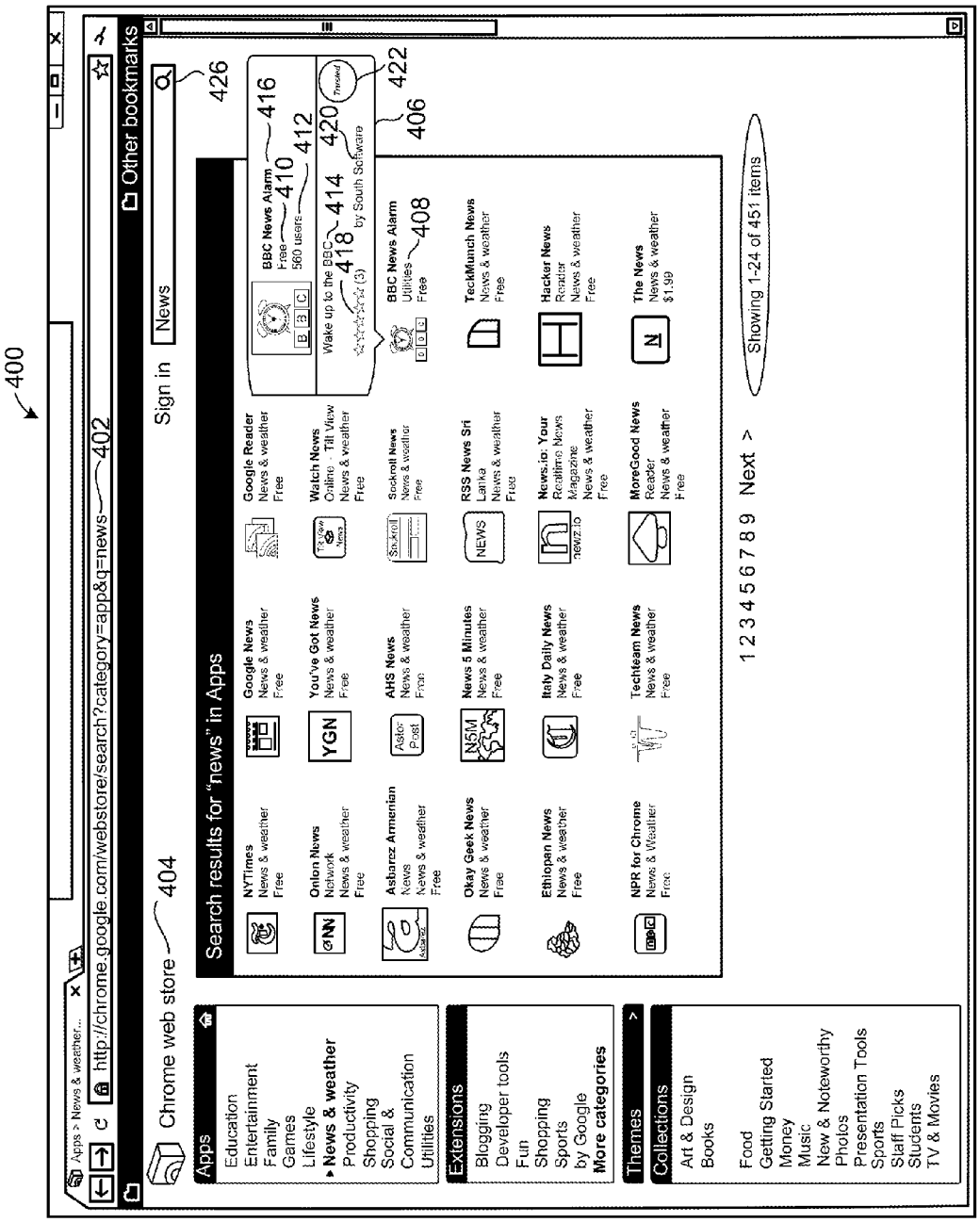
FIG. 4 illustrates a user interface for a web browser.

FIG. 4 illustrates a user interface 400 for a marketplace of digital goods. The user interface is an example of a screen that may be displayed when a user enters a query term "news" in query box 426 to search for web applications available in the marketplace that are related to news. The query term may be compared to metadata associated with digital goods, for example, data stored in digital goods repository 240. Based on the comparison, a query handler may identify one or more digital goods that are related to the query term. The applications that are selected for display in the user interface may be selected based on a ranking of the relative desirability of the identified applications. Furthermore, among the selected subset of applications, the position of the applications within the user interface 400 may be determined by their ranking. For example, applications with higher rankings may be displayed in rows at the top of the user interface 400, and, within a row, applications with a higher ranking may be displayed on the left side of the row.

A pop-up HTML window 406 may be displayed when a user moves a mouse icon over an icon for an application 408 that is displayed in the user interface 400. Within the pop-up HTML window 406, additional information about the web application 408 may be displayed. For example, a field 410 may indicate whether the application is free or the price that must be paid to be able to download and install the app. Another field 412 may indicate how many users have downloaded and/or installed and/or used the application. Information about the installation and/or use of the application on a client device may be transmitted from a browser executing the application of the client device to the marketplace server 350. Another field 414 may display descriptive information about the web application that supplements information in the title field 416. Another field 418 may display an average subjective rating that users have provided of the web application and a number of users that have rated the application. Another field 420 may display the name of the author or developer of the application.

Another field 422 may display information reflecting that web application 408 is trusted (or not trusted). For example, if the author ("South Software" as shown in field 420) is on a trusted authors list of the user, field 422 may display a "trusted" indicator, as shown. Additional information, such as a written warning explaining why an application is or is not trusted may also be displayed, for example in a pop-up window. Warnings may be tailored to a particular user. For example, a user who is more concerned with security may get additional, or more specific warnings than another user who is less concerned with security. For example, a user who does not wish to allow applications to access local storage media may receive warnings regarding any applications that request access to local storage media.

Figure 5:
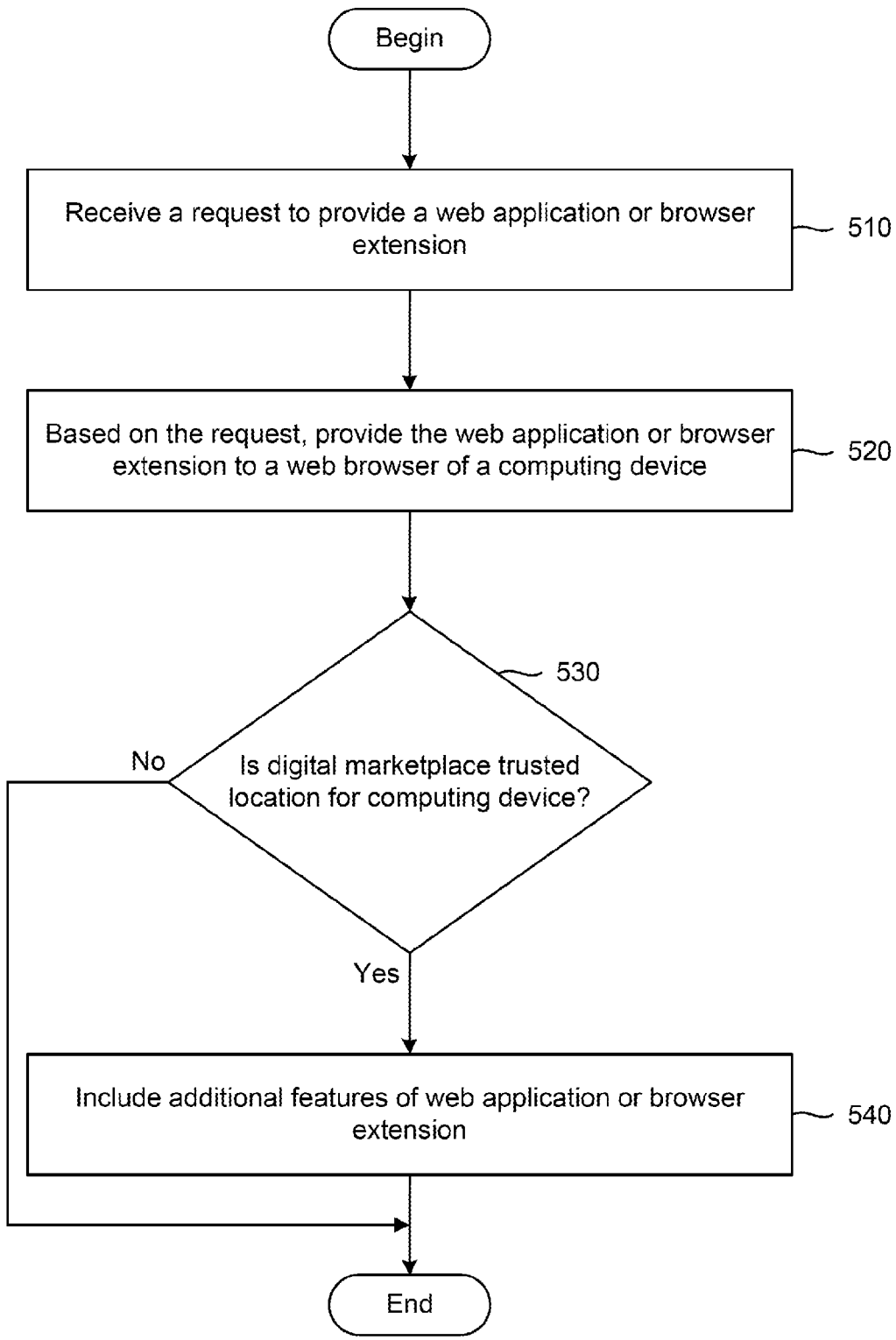
FIG. 5 illustrates a flowchart of an exemplary process for managing permissions and capabilities for web applications and browser extensions.

FIG. 5 is a flowchart of a process for managing permissions and capabilities for web applications and browser extensions. The flowchart shown in FIG. 5 may be performed at least in part by a server (e.g., digital marketplace server 150 shown in FIG. 1). As shown in FIG. 5, the server receives a request to provide a web application or a browser extension (step 510), for example via network 160 shown in FIG. 1. The request may be received via a digital marketplace. Based on the request, the web application or browser extension is provided to a web browser of a computing device (e.g., web browser 312 of computing device 300 shown in FIG. 3) (step 520). A determination is made if the digital marketplace is a trusted location for the computing device (step 530). If not, the process ends. If the digital marketplace is a trusted location for the computing device, additional features of the web application or browser extension are included (step 540). For example, additional features that may be included for web applications or browser extensions that are installed from a trusted location include: access to the computing device's storage mediums, access to a camera, access to a location sensor, access to personal data of a user of the computing device, the ability to issue pop-up notifications to the user, or access to usage data, for example. The additional features may be included on an opt-in basis after approval by a user. In some implementations, these features are not included during installation for web applications or browser extensions installed from a non-trusted location.

Figure 6:
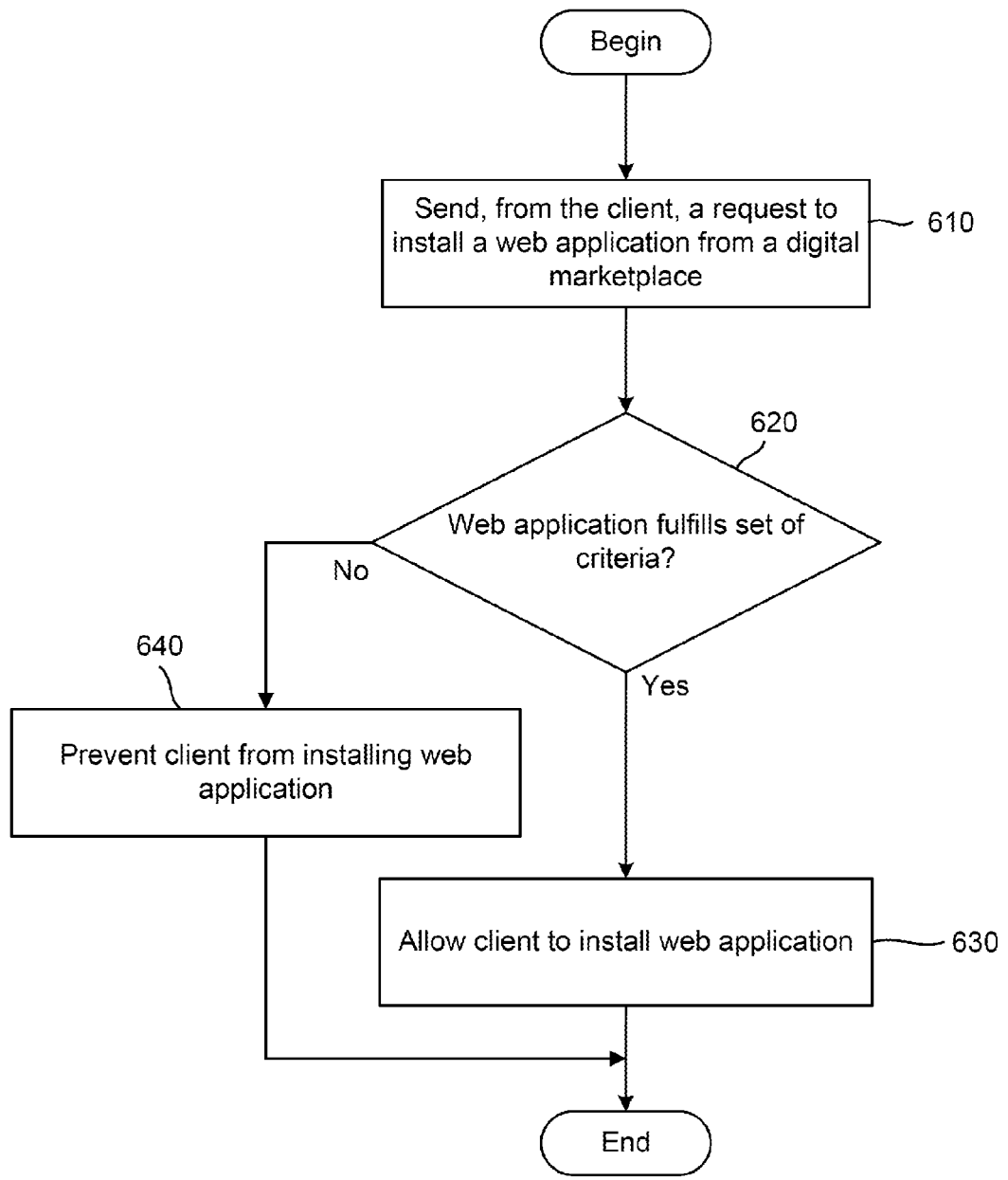
FIG. 6 is a flowchart of an exemplary process for enabling installation of web applications from trusted sources.

FIG. 6 is a flowchart of a process for enabling installation of web applications from trusted sources. The flowchart shown in FIG. 6 may be performed at least in part by a computing device (e.g., devices 110A, 110B shown in FIG. 1 or computing device 300 shown in FIG. 3). A request to install a web application from a digital marketplace (e.g., digital marketplace server 150 shown in FIG. 1) is sent from a client (step 610). A determination is made if the web application fulfills a set of criteria (e.g., trust criteria 326 shown in FIG. 3) (step 620).

The set of criteria may include, for example, that the digital marketplace is a trusted location or that an author (e.g., a person, a company, etc.) of the web application is trusted. For example, a corporation may decide that its employees may automatically download applications if they are authored by Google® or Amazon®. If the web application fulfills the set of criteria, (620, yes), then the client is allowed to install the web application (step 630). If the web application does not fulfill the set of criteria (620, no), then the client is prevented from installing the web application (step 640).

Figure 7:
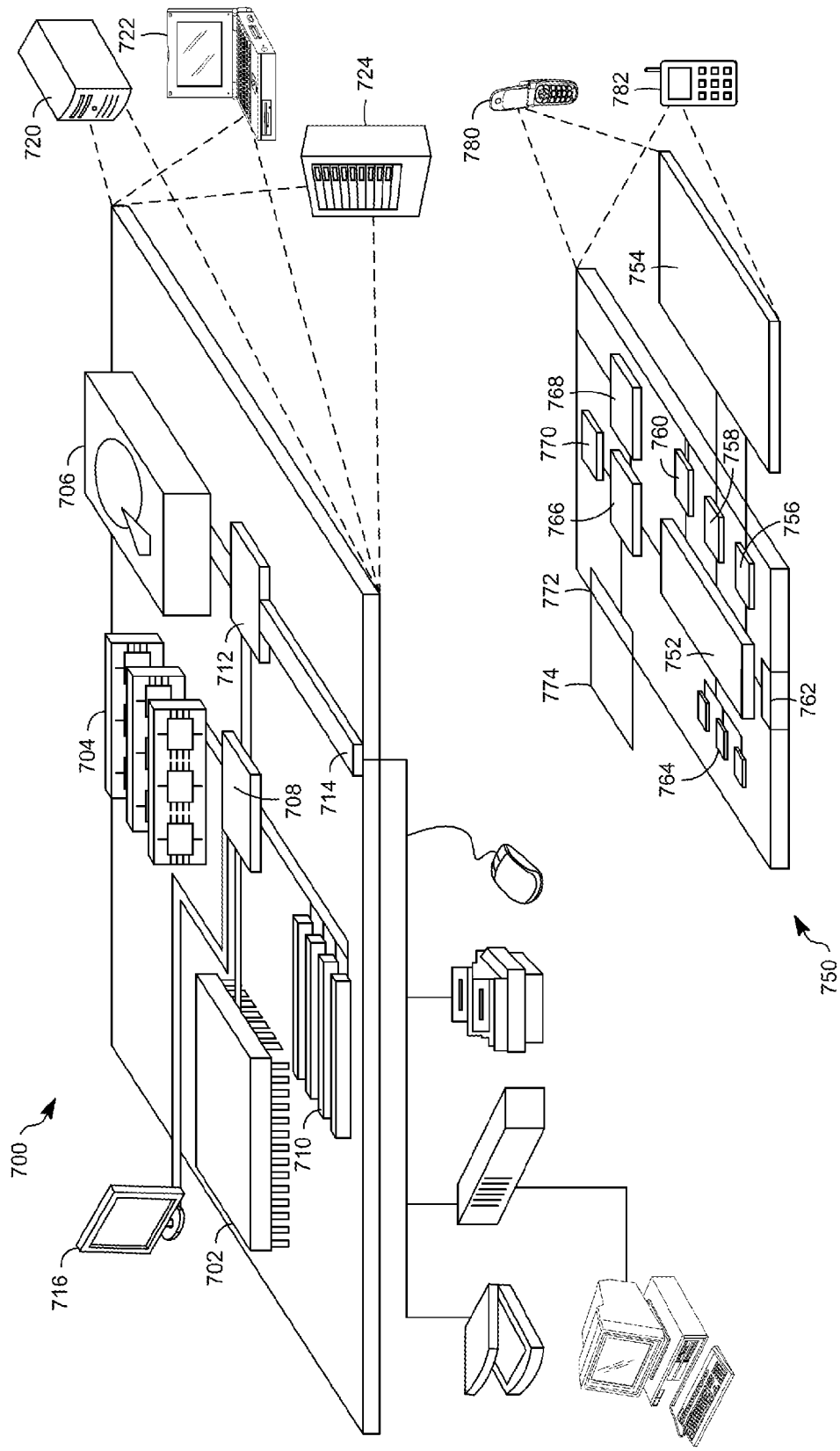
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for managing permissions and capabilities for web applications and web browser extensions, comprising:
    receiving a request via a digital marketplace to provide a web application or a web browser extension to a computing device;
    based on the request, providing the web application or the web browser extension to a web browser of the computing device, wherein the providing the web application or the web browser extension includes:
        determining if the digital marketplace is a trusted location for the computing device based on a set of trust criteria;
        including additional features of the web application or the web browser extension if the digital marketplace is determined to be the trusted location, wherein the additional features include access to specific resources of the computing device including one or more of a camera or a location sensor associated with the computing device; and
        excluding the additional features of the web application or the web browser extension but including limited features of the web application or the web browser application if the digital marketplace is not determined to be a trusted location.

2. The computer-implemented method of claim 1, wherein the set of trust criteria includes one of: a list of trusted authors, and a list of trusted websites.

3. The computer-implemented method of claim 1, wherein the trust criteria are synced between the computing device and at least one other computing device based on an account of a user associated with the computing device and the at least one other computing device.

4. The computer-implemented method of claim 1, wherein the additional features are specified by a user.

5. The computer-implemented method of claim 1, wherein the trust criteria are specified by a user of the computing device.

6. The computer-implemented method of claim 1, wherein the trust criteria are stored at a server.

7. The computer-implemented method of claim 1, wherein the additional features include machine executable code configured to be executed directly by a processor of the computing device.

8. A computer-implemented method for enabling installation of web applications from trusted sources, comprising:
    sending, from a client, a request to install a web application from a digital marketplace;
    allowing the client to install the web application in the client with additional features if the web application fulfills a set of criteria, wherein the set of criteria include that the digital marketplace is a trusted location and that an author of the web application is trusted, and wherein the additional features include access to specific resources of the client including one or more of a camera or a location sensor associated with the client; and excluding the additional features from the web application but allowing installing limited features of the web application if the web application fails to fulfill the set of criteria.

9. The computer-implemented method of claim 8, further comprising:

upon sending the request, determining if the digital marketplace is the trusted location and if an author of the web application is trusted.

10. The computer-implemented method of claim 8, wherein the set of criteria is synced between the client and at least one other computing device based on an account of a user associated with the client and the at least one other computing device.

11. The computer-implemented method of claim 8, further comprising:

upon excluding the additional features, displaying a notification representing that the set of criteria is not fulfilled.

12. A non-transitory computer-readable storage medium having recorded and stored thereon instructions that, when executed by a processor of a computer system cause the computer system to:

receive, from a client, a request to provide a web application or a web browser extension;

based on the request, provide the web application or the web browser extension to a web browser of the client, including:

determine if a digital marketplace is a trusted location for the client based on a set of trust criteria;

include additional features of the web application or the web browser extension if the digital marketplace is determined to be the trusted location, wherein the additional features include access to specific resources of the client including one or more of a camera or a location sensor of the client; and exclude the additional features from the web application or the web browser extension, but include limited features of the web application or the web browser extension if the digital marketplace is not determined to be the trusted location.

13. The non-transitory computer-readable storage medium of claim 12, wherein the set of trust criteria includes one of: a list of trusted authors, and a list of trusted websites.

14. The non-transitory computer-readable storage medium of claim 12, wherein the additional features include access to client data.

15. The non-transitory computer-readable storage medium of claim 12, wherein the additional features are specified by a user associated with the client.

16. The non-transitory computer-readable storage medium of claim 12, wherein the trust criteria are synced between the client and at least one other computing device based on an account of a user associated with client and the at least one other computing device.

17. The non-transitory computer-readable storage medium of claim 12, wherein the additional features include machine executable code configured to be executed directly by a processor of the client.

18. A system comprising:

a memory configured to store executable code; and a processor operably coupled to the memory, the processor configured to execute the code to:

receive a request via a digital marketplace to provide a web application or a web browser extension to a computing device;

based on the request, provide the web application or the web browser extension to a web browser of the computing device, including:

determining if the digital marketplace is trusted for the computing device based on a set of trust criteria;

including additional features of the web application or the web browser extension if the digital marketplace is determined to be trusted, wherein the additional features include access to specific system resources of the computing device including one or more of a camera or a location sensor of the computing device; and exclude the additional features from the web application or the web browser extension, but include limited features of the web application or the web browser extension if the digital marketplace is not determined to be trusted.

19. The system of claim 18, wherein the processor is further configured to include the additional features by including one or more web pages packaged as an installable entity.

20. The system of claim 19, wherein the processor is further configured to include the additional features by including a manifest file and a script file.

* * * * *